United States Patent [19]

Davies

[11] 4,189,194
[45] Feb. 19, 1980

[54] COATED PLAIN BEARING AND PROCESS OF MANUFACTURE

[75] Inventor: Glyndwr J. Davies, Southall, England

[73] Assignee: The Glacier Metal Company Limited, Middlesex, England

[21] Appl. No.: 846,134

[22] Filed: Oct. 27, 1977

Related U.S. Application Data

[63] Continuation-in-part of Ser. No. 557,291, Mar. 11, 1975, Pat. No. 4,148,966.

[30] Foreign Application Priority Data

Jan. 22, 1975 [GB] United Kingdom ................. 2750/75

[51] Int. Cl.$^2$ ..................... F16C 19/50; C10M 7/36; B05D 1/24
[52] U.S. Cl. ................. 308/35; 29/149.5 R; 29/149.5 NM; 252/12; 308/241; 308/DIG. 8; 308/DIG. 9; 427/185; 427/201; 427/320; 427/375; 427/388 A; 427/409; 428/36; 428/419; 428/457

[58] Field of Search ............... 427/185, 385 R, 388 R, 427/388 A, 201, 320, 375, 409; 308/72, 241, DIG. 8, DIG. 9, 35; 252/12; 29/148.4, 148.5 R, 149.5 NM; 428/419, 457, 36

[56] References Cited

U.S. PATENT DOCUMENTS

| | | | |
|---|---|---|---|
| 3,372,113 | 3/1968 | Naeser et al. | 252/12 |
| 3,882,030 | 5/1975 | Campbell et al. | 252/12 |
| 3,931,419 | 1/1976 | Blackwell | 427/388 C |
| 3,931,421 | 1/1976 | Tieszen | 427/385 |
| 3,985,661 | 10/1976 | Ikeda et al. | 252/12 |
| 4,015,949 | 4/1977 | Baker | 308/DIG. 8 |
| 4,036,822 | 7/1977 | Patel et al. | 428/419 X |
| 4,086,376 | 4/1978 | Davies | 428/457 X |

Primary Examiner—Michael F. Esposito
Assistant Examiner—Thurman K. Page
Attorney, Agent, or Firm—Burns, Doane, Swecker & Mathis

[57] ABSTRACT

This invention is for providing a bearing lining on a backing, for example of aluminum, and uses polyphenylene sulphide which has good bearing properties, in combination with a base comprising a component of a metal from Group I or Group II of the Periodic Table, to effect a good bond between the lining and the backing.

6 Claims, No Drawings

COATED PLAIN BEARING AND PROCESS OF MANUFACTURE

This is a continuation-in-part of application Ser. No. 557,291, filed March 11, 1975, now U.S. Pat. No. 4,148,966.

This invention relates to the coating of an aluminum or aluminum alloy backing, with a layer or coating of polyarylene sulphide resin to form a plain bearing.

Polyarylene sulphides such as polyphenylene sulphide have high temperature stability. The term polyarylene sulphide includes homopolymers and also normally solid arylene sulphide co-polymers and terpolymers.

Polyphenylene sulphide is a crystalline material prepared by the reaction of p-dichlorobenzene and sodium sulphide in a polar solvent. The linear polymer so formed has a fair mechanical strength but it can be cured by heating in air to be cross-linked and to be tough, ductile and extremely insoluble with increased molecular weight and improved coating characteristics. In this specification the term "polyphenylene sulphide" or the more generic term "polyarylene sulphide" includes such polymers with varying degrees of cross-linking in dependence on the heat treatment used.

Polyphenylene sulphide as one form of polyarylene sulphide is itself available in several forms—one form is the raw polymer which has not been heat treated in air to improve its characteristics. Other forms of polyphenylene sylphide can be heat treated in air to increase also the cross-linking. The non-heat treated, or raw, forms of the polymer are unsuitable for fluidised bed coatings because when the powder melts the coating runs and drips during curing. Similarly the non-heat treated polymers are unsuitable for providing a coating by spreading the powder on the substrate because again the viscosity is unsuitable and it tends to leave voids in the coating or imperfections during heat processing. The grades of polymer which have been treated either completely or partially do not suffer from these defects when they are applied as coatings and cured but tend to have worse bonding characteristics than the untreated polymer.

In U.S. Pat. No. 3,930,078 (Short) is disclosed a method of coating an unspecified type of substrate with polyarylene sulphide in which there has been incorporated one or another of a group of additives composed of:

tetrakis [3-(3,5-di-tert-butyl-4-hydroxyphenyl) propionyloxymethyl] methane,
1,3,5-trimethy tris [3,5-di-tert-butyl-4-hydroxybenzyl] benzene
octadecyl-3-(3',5'-di-tert-butyl-4'-hydroxyphenyl) propionate, or
a polymeric phosphite.

The presence of one or another of these additives in the polymer prior to curing is said to accelerate the rate of curing or/and to reduce the temperature required for the curing. Another real advantage is that by the proper proportioning of additives to polymer the normal tendency of the polymer to run when melted seems to be reduced.

In U.S. Pat. No. 3,931,419 (Blackwell) a similar method of coating is disclosed. According to this patent the curing of the polymer is accelerated through the presence of one or another of a variety of unrelated components which may be listed as follows:

aluminum phosphate;

a polyfunctional benzene derivative in which at least two positions on the benzene nucleus are replaced by a functional group selected from OH and $NH_2$ with the substitution being in the meta or para position if only two positions are substituted;

a metal salt selected from cobalt sulphate, cobalt acetate, ferrous sulphate, or cupric naphthenate; and ammonium persulphate.

As in the case of the Short disclosure, a small amount of one or another of the above compounds admixed with the polymer seems to reduce the tendency to run when melted, and also to positively shorten the curing period.

The above list of compounds appear to be quite dissimilar in their make-up and in their classifications, but are asserted by Blackwell to have the common property of shortening the curing time and minimizing the fluidity of the melted polymer in the course of curing the arylene sulphide polymer. Some of the compounds are organic and some are inorganic. In the case of the salts mentioned, some are salts of organic acids and some are salts of inorganic acids. The numerically large sub-genus consists in various highly substituted benzene compounds.

In U.S. Pat. No. 3,853,824 (Tieszen) the patentee teaches that improved curing and improved final properties of a coating on a substrate are realized through incorporating a small amount of one or another of a variety of organic sulphides containing compounds in the polymer. The sulphide compounds are all substituted benzene compounds containing from 1-3—RSH groups. An illustrative embodiment consists in mixing polyphenylene sulphide with dodecylbenzyl mercaptan. Quite apart from the affect exerted on the polymer by the presence of the mercaptan, one may or may not include fillers of one sort or another, e.g. a pigment such as titanium dioxide.

An object of the present invention is to provide a polyarylene sulphide resin coating on an aluminum backing with a bond strong enough for use on an engineering plain bearing.

The prior art coatings described above are not bonded strongly enough for that purpose.

According to the invention a plain bearing comprises a backing of aluminum alloy and a coating on the backing and comprising a heat-treated polyarylene sulphide resin incorporating between 0.1 and 5.0% by weight of a strong base comprising a component of a metal from Group I or Group II of the Periodic Table, said base being stable at elevated temperatures up to at least 200° C., for establishing a bond between said backing and said coating.

A 'strong base' is a soluble salt capable of producing an alkali, with a high pH value regardless of its ability to neutralize an acid.

The coating may be of the order of 0.005–0.015 inches thick. The base may be mixed with the polymer or applied to the backing which is to be coated.

It is probable that the cause of bad bonding is the presence of the very easily hydrolyzed sulphur-aluminum bond. Such bonds could arise from acid attack of the oxidised aluminum surface from such species as $H_2S$ or a molecule containing SH pendant or end groups. Such attack would be inhibited by alkaline conditions.

Thus it is probable that the strong bases in the following list will be effective in preventing poor bonding when used at the correct concentration and provided that these additives remain as stable alkalis during the coating and curing process, that is, stable up to at least 300° C.

Li$_2$O, Li$_2$CO$_3$, Na$_2$O, NaOH, K$_2$O, KOH, k$_2$CO$_3$, Be(OH)$_3$, BeCO$_3$, Mg(OH)$_2$, MgCO$_3$, CaO, SrO, Sr(OH)$_2$, SrCO$_3$, BaO, Ba(OH)$_2$, BaCO$_3$.

Preferably, the preparation of the composition which is to be bonded to the backing is effected as follows: The basic component is admixed with water to form into a solution (or solution-suspension); then, the polyarylene sulphide in finely subdivided form is stirred into the solution forming a thick paste. This paste is dried in air, and the dried material is then powdered. The powdered material is applied to the metallic blank (or part to be coated) by the fluidized bed technique and is cured in situ by heating at about 300° C. for about 1 hour.

The coating so prepared and applied is very firmly bonded to the metallic support. Thus, the freshly produced coating cannot be picked off the support with a knife blade. When the coated blank is boiled in water for some hours and then tested for bond tightness the coating is found still firm and not removable by means of a knife blade. Storing in air for five days or so does not appreciably diminish the bond tightness of the coating to the support.

The following examples describe the manufacture of certain bearings in accordance with the invention.

EXAMPLE 1

100 g of magnesium hydroxide was dry mixed in a high speed powder mixer with 10 kg of heat treated polyphenylene sulphide powder.

The mixture was spread in a thin even layer onto an aluminum strip, melted and cured by heating in air for two hours at 380° C.

The cured lining was found to be well bonded to the aluminum strip such that it could not be removed by 'picking' with a knife blade even after boiling in water for two hours.

EXAMPLE 2

10 g of calcium oxide was dry mixed in a high speed powder mixer with 1 kg of heat treated polyphenylene sulphide powder.

The mixture was sprayed from electrostatic spraying equipment onto aluminum panels which had been heated to 370° C. After curing the linings by heating in air, at 370° C. for 2½ hours, the bond to the aluminum was found to be very good.

EXAMPLE 3

40 g of barium carbonate powder was dry mixed in a high speed mixer with 3 kg of heat treated polyphenylene sulphide powder.

The mixture was placed in a fluidizing bed and aluminum blanks heated to 360° C. were dipped into the fluidized mixture. The coating thus obtained was cured by heating in air at 360° C. for 1¾ hours, and the adhesion of the lining to the blank was assessed and found to be very good.

EXAMPLE 4

The procedure of EXAMPLE 1 was followed using 120 g of calcium oxide instead of the magnesium hydroxide.

EXAMPLE 5

The procedure of EXAMPLE 1 was following using 80 g of barium carbonate instead of the magnesium hydroxide.

What we claim as our invention and desire to secure by Letters Patent is:

1. A plain bearing comprising a backing of aluminum or aluminum alloy and a coating on the backing and comprising a heat-treated polyarylene sulphide resin incorporating between 0.1 and 5.0% by weight of a strong base comprising a component of a metal from Group I or Group II of the Periodic Table, said base being stable at elevated temperatures up to at least 200° C., for establishing a bond between said backing and said coating.

2. A backing as claimed in claim 1 in which the resin is polyphenylene sulphide.

3. A backing as claimed in claim 2 in which the resin has been heat treated in air.

4. A backing as claimed in claim 1 in which the resin and base have been combined in a liquid phase.

5. A backing as claimed in claim 1 in which the base is selected from the group:

Li$_2$O, Li$_2$CO$_3$, Na$_2$O, NaOH, K$_2$O, KOH, K$_2$CO$_3$, Be(OH)$_3$, BeCO$_3$, Mg(OH)$_2$, MgCO$_3$, CaO, SrO, Sr(OH)$_2$, SrCO$_3$, BaO, Ba(OH)$_2$, BaCO$_3$.

6. A method of manufacturing a plain bearing in which a backing of aluminum or aluminum alloy has a bearing lining bonded to it by mixing polyarylene sulphide polymer with between 0.1 and 5.0% by weight of a strong base comprising a component of a metal from Group I or Group II of the Periodic Table, applying the mixture to the backing, and curing the polymer by heating at a temperature of at least 360° C. for at least one hour.

* * * * *